R. HOADLEY.

Butt-Hinges.

No. 5,843.

Reissued April 21, 1874

Witnesses.
John Pollitt
Frank G. Fuller

R. Hoadley,
Inventor.
Assignee
Alvin Tapley
By W. E. Simonds Atty

UNITED STATES PATENT OFFICE.

ROBERT HOADLEY, OF DERBY, ASSIGNOR, BY MESNE ASSIGNMENTS, TO ALVIN TAPLIN, OF FORESTVILLE, CONNECTICUT.

IMPROVEMENT IN BUTT-HINGES.

Specification forming part of Letters Patent No. 41,664, dated February 16, 1864; reissue No. 5,843, dated April 21, 1874; application filed March 13, 1874.

*To all whom it may concern:*

Be it known that ROBERT HOADLEY, of Derby, New Haven county, Connecticut, invented an Improved Butt-Hinge, of which the following is a specification, reference being had to the accompanying drawings, where—

Figure 1:
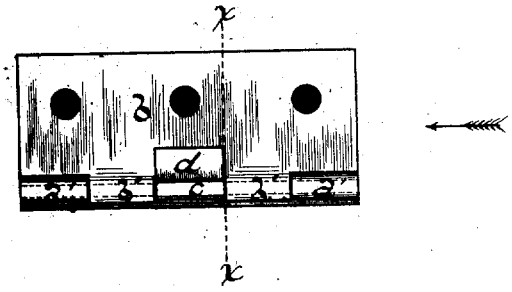
Figure 2:
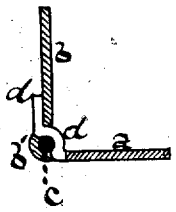

Figure 1 is a view of what may be termed the back side of a butt-hinge, embodying the said improvement. Fig. 2 is a view of the same in vertical transverse section on the plane indicated by the dotted line *x x*, and looking in the direction indicated by the arrow.

This hinge is what is known as a stop-hinge —that is, it is so constructed and arranged that it may be made to stop, so far as opening the hinge is concerned, at any desired point short of fully open, a thing that is, in many cases, desirable.

The invention consists in the construction and arrangement made use of for effecting this.

The letter *a* indicates one leaf of the hinge, and *b* the other. The former has the barrel-sections *a'* and the latter the barrel-sections *b'*. The wire *c* running through the longitudinal center of these barrel-sections connects the two leaves together, and serves as an axis whereon they turn. A wing, *d*, projecting from the leaf *a* runs up over the wire *c*, through the leaf *b*, to the back side thereof, there making a turn toward the outer edge of the leaf *b*, thereby forming a stop against which the leaf *b* will abut when opened, thus preventing this leaf from opening farther than the adjustment of this stop permits. It is obvious that this stop can be bent or adjusted so as to stop the opening of the leaf *b* at any desired point. The two leaves *a* and *b* are made of sheet metal.

This invention is claimed to be—

A hinge, having a wing, *d*, starting from one leaf, *a*, running over the axis-wire *c*, and through the other leaf *b*, and there turned or bent to form a stop for such other leaf, the whole constructed, arranged, and designed for operation and use substantially as shown and described.

In witness whereof I, the assignee, by mesne assignments, of the said ROBERT HOADLEY, have hereto set my hand.

ALVIN TAPLIN.

Witnesses:

GEORGE G. SILL,

WM. EDGAR SIMONDS.